(12) United States Patent
Nakajima et al.

(10) Patent No.: US 6,986,291 B2
(45) Date of Patent: Jan. 17, 2006

(54) TORQUE DETECTOR WITH MONOLITHIC TUBULAR HOUSING

(75) Inventors: Terukazu Nakajima, Nara (JP); Suzo Hirakushi, Nara (JP)

(73) Assignee: Koyo Seiko Co., Ltd., Osaka (JP)

( * ) Notice: Subject to any disclaimer, the term of this patent is extended or adjusted under 35 U.S.C. 154(b) by 73 days.

(21) Appl. No.: 10/765,900

(22) Filed: Jan. 29, 2004

(65) Prior Publication Data

US 2004/0182177 A1 Sep. 23, 2004

(30) Foreign Application Priority Data

Jan. 31, 2003 (JP) ............................. P.2003-024794

(51) Int. Cl.
*G01L 3/00* (2006.01)
(52) U.S. Cl. .................................... 73/862.08
(58) Field of Classification Search ................. 73/856, 73/862.08

See application file for complete search history.

(56) References Cited

U.S. PATENT DOCUMENTS

| | | | | |
|---|---|---|---|---|
| 4,047,564 A | * | 9/1977 | Nix et al. ...................... 166/72 |
| 4,527,896 A | * | 7/1985 | Irani et al. ..................... 356/43 |
| 4,628,995 A | * | 12/1986 | Young et al. ................. 166/113 |
| 4,974,489 A | * | 12/1990 | Fishbaugh .................... 89/14.4 |
| 5,302,934 A | * | 4/1994 | Hart et al. ................. 338/22 R |
| 6,006,610 A | * | 12/1999 | Lehnert .................... 73/862.08 |
| 6,328,128 B1 | | 12/2001 | Chikaraishi |

FOREIGN PATENT DOCUMENTS

| | | |
|---|---|---|
| DE | 195 03 874 A1 | 8/1996 |
| EP | 0 481 568 A1 | 4/1992 |
| JP | 01-244322 | 9/1989 |
| JP | 7-21433 | 3/1995 |
| WO | WO 98/26972 | 6/1998 |

OTHER PUBLICATIONS

European Search Report dated Nov. 8, 2004.

* cited by examiner

*Primary Examiner*—Max Noori
(74) *Attorney, Agent, or Firm*—McGinn IP Law Group, PLLC

(57) ABSTRACT

A torque detector includes: a monolithic tubular housing for supporting a rotating shaft, including an opening at one end in a longitudinal direction; a sensor holding hole for holding a sensor part detecting a rotating torque exerted on the rotating shaft, which is provided inside the housing and communicates with the opening; a board chamber for accommodating a circuit board outputting a signal corresponding to the detected rotating torque, which is provided inside the housing and communicates with the opening; a partition wall between the sensor holding hole and the board chamber; and a lead hole passing through the partition wall, into which a lead connecting the sensor part to the circuit board is inserted and which communicates with the opening. The housing is formed by drawing a sheet material in the longitudinal direction.

3 Claims, 4 Drawing Sheets

TORQUE DETECTOR WITH MONOLITHIC TUBULAR HOUSING

BACKGROUND OF THE INVENTION

The present invention relates to a torque detector for detecting a rotating torque exerted on a steering member for steering in, for example, an electric power steering apparatus, and a method of manufacturing a housing of the torque detector.

There is an electric power steering apparatus in which a motor for assisting a steering in accordance with the rotating operation of a steering member for steering (for instance, a steering wheel) is driven to transmit the torque of the motor to a steering mechanism and assist the steering. In the power steering apparatus, the rotating torque exerted on the steering member needs to be detected to use the rotating torque for controlling to drive the motor for assisting the steering. For detecting the rotating torque, a torque detector formed halfway a rotating shaft (column shaft) connecting the steering member to the steering mechanism has been hitherto employed.

In the torque detector, the column shaft is divided into a first shaft and a second shaft connected in the coaxial direction through a torsion bar having a small diameter. When the steering member for steering is rotated, a relative angular displacement is generated between the first and second shafts accompanied by the displacement of the torsion bar due to the action of the rotating torque so that the rotating torque is detected through the relative angular displacement.

The relative angular displacement can be detected with such a structure as described below (for instance, see Patent Document 1). For instance, detecting rings are respectively externally fitted and fixed to parts near the connecting part of both first and the second shafts. A sensor coil (sensor part) is internally fitted and held so as to enclose the opposed parts of the detecting rings in a sensor holding hole provided inside a tubular housing for supporting the column shaft to form a magnetic circuit passing the opposed parts of the detecting rings by supplying coil current to the sensor coil. Thus, the change of the opposed relation of the respective detecting rings corresponding to the relative angular displacement between the first and second shafts due to the operation of the rotating torque is taken out as the change of impedance of the sensor coil in accordance with the increase or decrease of the magnetic resistance of the magnetic circuit through a circuit board attached to the inner part of a board chamber which is isolated from the sensor holding hole inside the housing (for instance, see Patent Document 1).

The board chamber to which the circuit board is attached communicates with the inner part of the sensor holding hole through a lead hole passing through a partition wall between the sensor holding hole and the board chamber. The sensor coil is connected to the circuit board through a connecting lead extended from the sensor coil, inserted into the lead hole and guided to the board chamber.

Patent Document 1

JP-8-7-21433

The attachment of the torque detector constructed as described above is realized in such a procedure as described below. The sensor coil as the sensor part is fitted to the inner part of the sensor holding hole and fixed and held at a prescribed position. The circuit board is attached to the board chamber inside the housing. The circuit board is connected to the sensor coil through the connecting lead inserted into the lead hole as described above.

However, in the above-described attaching procedure, the sensor coil is fitted to the inner part of the sensor holding hole via an opening part at one side in the longitudinal direction. The circuit board is attached to the inner part of the board chamber from outside in the diametrical direction of the housing. These operations are carried out in separate processes. In addition thereto, during these operations, an operation for connecting the connecting lead inserted into the lead hole to the circuit board has to be done and a large number of attaching processes are inconveniently required.

The housing to which the sensor coil and the circuit board are attached is ordinarily made of aluminum casting for the purpose of achieving a lightweight. The after-treatment of the sensor holding hole for internally fitting and holding the sensor coil, the board chamber to which the circuit board is attached and the lead hole through which both the members communicate with each other is necessary. Many processes are undesirably required to work them. Further, the output of the torque detector taken out from the sensor coil through the circuit board is affected by external electromagnetic noise generated in an engine, devices mounted on a vehicle or the like. Thus, there is a fear that detection accuracy may be possibly deteriorated.

The torque detector used for detecting the rotating torque exerted on the steering member in the electric power steering apparatus is not limited to the above-described structure including the detecting rings externally fitted and fixed to the column shaft and the sensor coil internally fitted and held in the sensor holding hole of the housing. The torque detector is put to practical use in various kinds of structures. In any of the structures, the sensor part held in the sensor holding hole of the housing is connected to the circuit board attached to the inner part of the board chamber isolated from the sensor holding hole. The output of the sensor part is taken out through the circuit board. The output of the sensor part held in the sensor holding hole of the housing is taken out through the circuit board attached to the outer side of the housing. Accordingly, it is an important purpose to easily attach the sensor part and the circuit board to the housing, reduce the number of working processes of the housing for attaching them and prevent the deterioration of detection accuracy due to the influence of electromagnetic noise.

SUMMARY OF THE INVENTION

The present invention is proposed by considering the above-described circumstances. It is an object of the present invention to provide a torque detector in which a sensor part and a circuit board of the torque detector can be easily attached to a housing and the housing can be easily worked for attaching these members, the influence of electromagnetic noise can be reduced under its using state as much as possible and torque can be highly accurately detected, and a method of manufacturing the housing of the torque detector In order to solve the aforesaid object, the invention is characterized by having the following arrangement.

(1) A torque detector comprising:

a monolithic tubular housing for supporting a rotating shaft, including an opening at one end in a longitudinal direction;

a sensor holding hole for holding a sensor part detecting a rotating torque exerted on the rotating shaft, which is provided inside the housing and communicates with the opening;

a board chamber for accommodating a circuit board outputting a signal corresponding to the detected rotating torque, which is provided inside the housing and communicates with the opening;

a partition wall between the sensor holding hole and the board chamber; and a lead hole passing through the partition wall, into which a lead connecting the sensor part to the circuit board is inserted and which communicates with the opening, wherein the housing is formed by drawing a sheet material in the longitudinal direction.

(2) A torque detector according to (1), wherein the housing is made of steel.

(3) A torque detector according to (1), wherein the housing includes a flange formed around the opening.

(4) A method of manufacturing a housing of a torque detector which includes a sensor holding hole for holding a sensor part detecting a rotating torque exerted on the rotating shaft, a board chamber for accommodating a circuit board outputting a signal corresponding to the detected rotating torque, a partition wall between the sensor holding hole and the board chamber, and a lead hole passing through the partition wall, into which a lead connecting the sensor part to the circuit board is inserted, the method comprising the steps of:

providing a sheet material as a material of the housing, a female mold for forming an outer surface shape of the housing and a male mold for forming an inner surface shape of the housing;

arranging the sheet material between the female and male molds; and pushing the male mold into the female mold so as to forming the sheet material into the housing so that the sensor holding hole, the board chamber and the lead hole respectively extend in the pushing direction and communicate with each other.

DETAILED DESCRIPTION OF PREFERRED EMBODIMENTS

Figure 1:
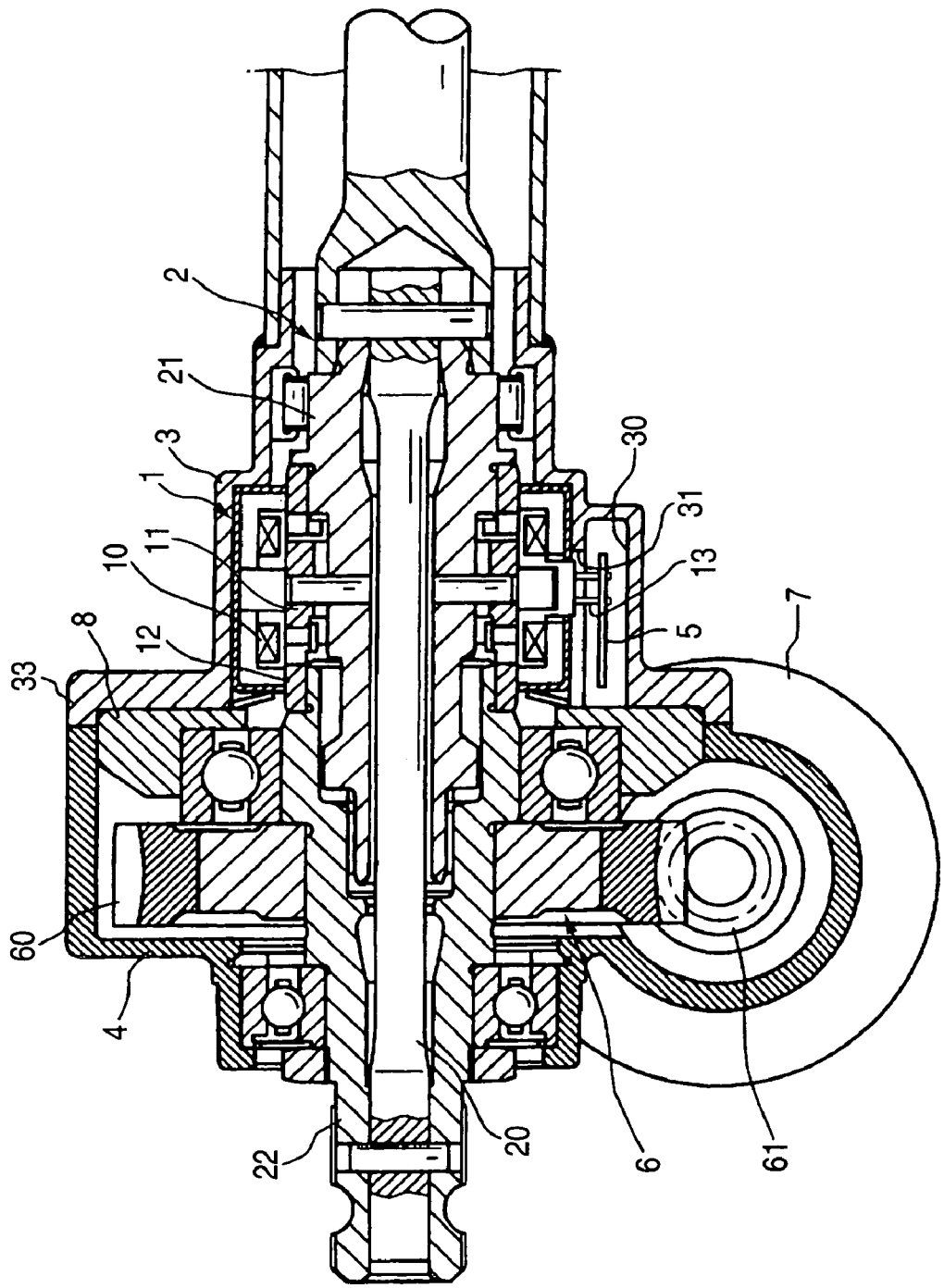
FIG. 1 is a longitudinally sectional view showing the structure of a torque detector according to the present invention.

Now, an embodiment according to the present invention will be described in detail with reference to the drawings. FIG. 1 is a longitudinally sectional view showing the structure of a torque detector according to the present invention. In FIG. 1, an example applied to an electric power steering apparatus is shown. The torque detector 1 is designed to detect a rotating torque exerted on a column shaft (rotating shaft) 2 supported in a tubular sensor housing 3 so as to freely rotate.

The column shaft 2 is divided into a first shaft 21 and a second shaft 22 connected to each other in a coaxial direction through a torsion bar 20 having a small diameter. The end part of the first shaft 21 protruding to one side of the sensor housing 3 is connected to a steering member not shown. The end part of the second shaft 22 protrudes to the other side of a transmitting housing 4 at the same one side of the sensor housing 3 and is connected to a steering mechanism not shown.

In the above-described structure, the first shaft 21 and the second shaft 22 can integrally rotate by the action of the rotating torque exerted on the column shaft 2 in accordance with the rotating operation of the steering member. The rotating operation of the steering member for steerage is transmitted to the steering mechanism and a steering is done by the operation of the steering mechanism. At this time, the torsion bar 20 for connecting the first and second shafts 21 and 22 together is displaced by the action of the rotating torque to generate a relative angular displacement corresponding to the displacement of the torsion bar 20 between the first shaft 21 and the second shaft 22. Since the direction and magnitude of the relative angular displacement correspond to the direction and magnitude of the rotating torque, the rotating torque exerted on the steering member can be detected on the basis of the relative angular displacement between both the shafts 21 and 22.

To parts near the connecting part of the first shaft 21 and the second shaft 22, cylindrical detecting rings 11 and 12 are respectively externally fitted and fixed. On opposed end faces of the detecting rings 11 and 12 which are opposed to each other with a space of a substantially prescribed air gap, a plurality of tooth parts are respectively arranged in parallel so that their halves are respectively opposed in the circumference direction. Outside the detecting rings 11 and 12, a sensor coil (sensor part) 10 internally fitted and held in the sensor housing 3 is disposed so as to enclose the opposed parts of both the rings 11 and 12. These detecting rings 11 and 12 and the sensor coil 10 form the torque detector 1.

The torque detector 1 forms a magnetic circuit passing the tooth parts formed in the opposed end faces of the detecting rings 11 and 12 by supplying coil current to the sensor coil 10. Thus, the torque detector detects the relative angular displacement between the first shaft 21 and the second shaft 22 due to the action of steering torque by using the increase or decrease of the magnetic resistance of the magnetic circuit generated in accordance with the change of the opposed relation of the tooth parts of the detecting rings 11 and 12 rotating integrally with these shafts. Thus, the change of impedance of the sensor coil 10 is taken out as an output.

Inside the sensor housing 3, a board chamber 30 is integrally formed so as to correspond to the holding position of the sensor coil 10. A circuit board 5 having a feeder circuit and an output processing circuit is accommodated in the board chamber 30. The sensor coil 10 has a connecting lead 13 protruding at one position in the circumference direction. The sensor coil 10 is connected to the circuit board 5 through the lead 13 inserted into a lead hole 31 passing through a partition wall between the board chamber 30 and a sensor holding hole 32. Thus, coil current is fed to the sensor coil 10 and the impedance of the sensor coil 10 is taken out through the circuit board 5.

A worm gear transmission device 6 is formed in the transmitting housing 4 connected to the sensor housing 3. The worm gear transmission device includes a worm wheel 60 externally fitted and fixed to the intermediate part of the second shaft 22 and a worm 61 tangentially engaging with tooth parts on the outer periphery of the worm wheel 60. A motor 7 for assisting a steering is attached to the outer peripheral part of the transmitting housing 4. The output shaft of the motor 7 extending to the inner part of the transmitting housing 4 is connected to one end of the worm 61 in the coaxial direction.

The motor 7 for assisting a steering is controlled and driven on the basis of the detected result of the steering torque by the torque detector 1 formed as mentioned above. The rotation of the motor 7 driven in such a way is transmitted to the column shaft 2 (second shaft 22) via a reduction by the worm gear transmission device 6 having the worm 61 and the worm wheel 60. The rotation of the column shaft 2 is transmitted to the steering mechanism to assist a steering transfer performed by the operation of the steering mechanism.

Figure 2:
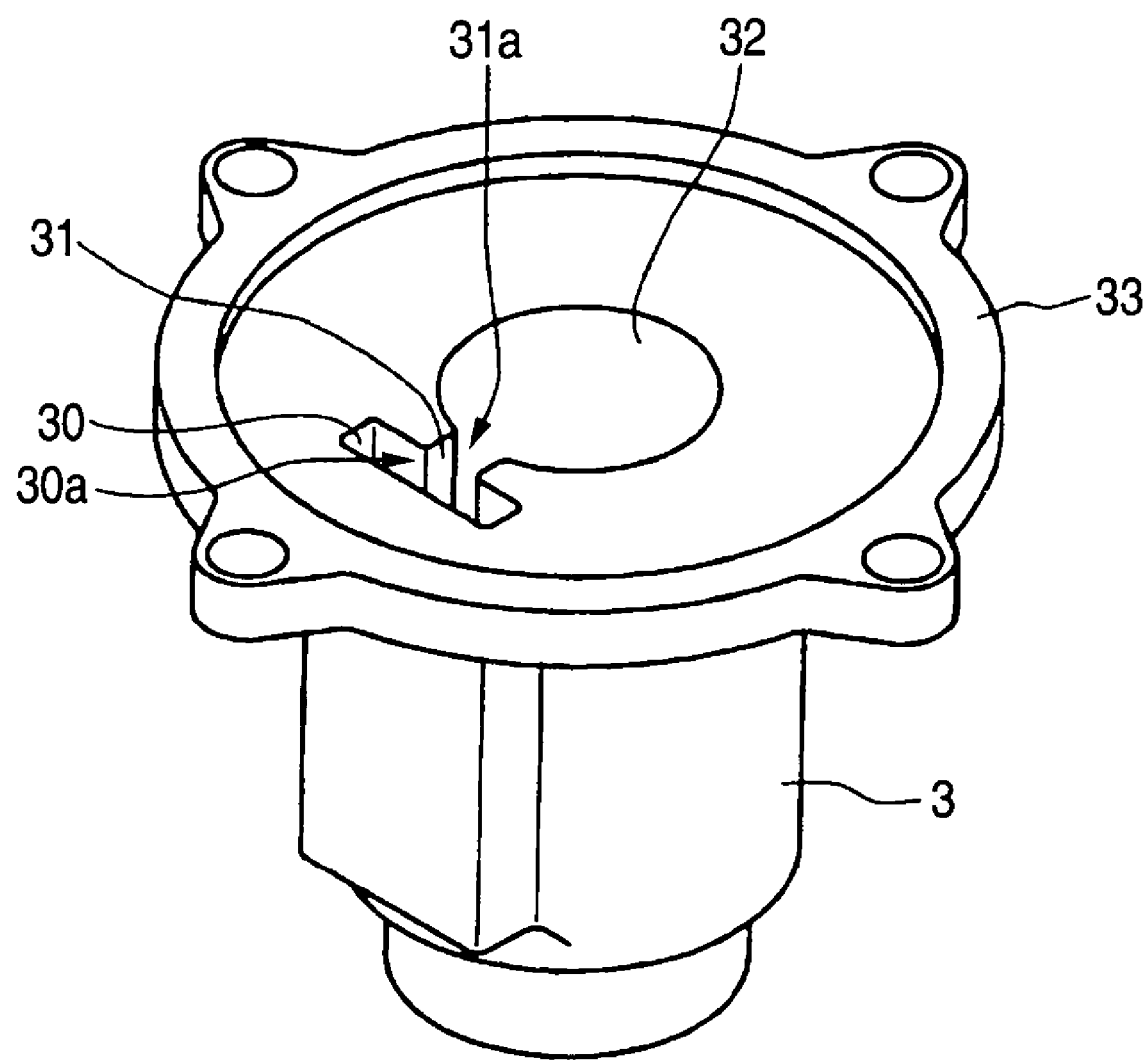
FIG. 2 is a perspective view schematically showing the outward appearance of a sensor housing.

The feature of the torque detector 1 according to the present invention resides in the structure of the sensor housing 3 which holds the sensor coil 10 as the sensor part and to which the circuit board 5 is attached. FIG. 2 is a perspective view schematically showing the outward appearance of the sensor housing 3.

As shown in FIG. 2, the sensor housing 3 has a cylindrical form having the sensor holding hole 32 for holding the sensor coil 10 at its axis part. At one end part in the longitudinal directions a connecting flange 33 for connecting the transmitting housing 4 to the sensor housing is provided. Further, in the sensor housing 3, the board chamber 30 formed in a rectangular box shape for accommodating the circuit board 5 is provided at one position in the circumference direction. The board chamber 30 is allowed to communicate with the sensor holding hole 32 in an inner side through the lead hole 31 passing through the partition wall between the board chamber and the sensor holding hole 32.

In the present invention, the board chamber 30 is extended to the connecting side to the transmitting housing 4 throughout its entire width and communicates with a rectangular opening 30a opened on the flange surface of the connecting flange 33 at the same side. Further, the lead hole 31 is a slot extended to the connecting side to the transmitting housing 4 and communicates with a groove-shaped opening 31a opened on the flange surface of the connecting flange 33 at the same side throughout its entire width.

The above-described sensor housing 3 has a cup form extended from one side in the longitudinal direction, that is, the flange surface side of the connecting flange 33 toward the other side. Further, the board chamber 30 and the lead hole 31 provided at one position in the circumference direction communicate with the flange surface, so that they can be considered to be one part of the cup form.

Figure 3A:
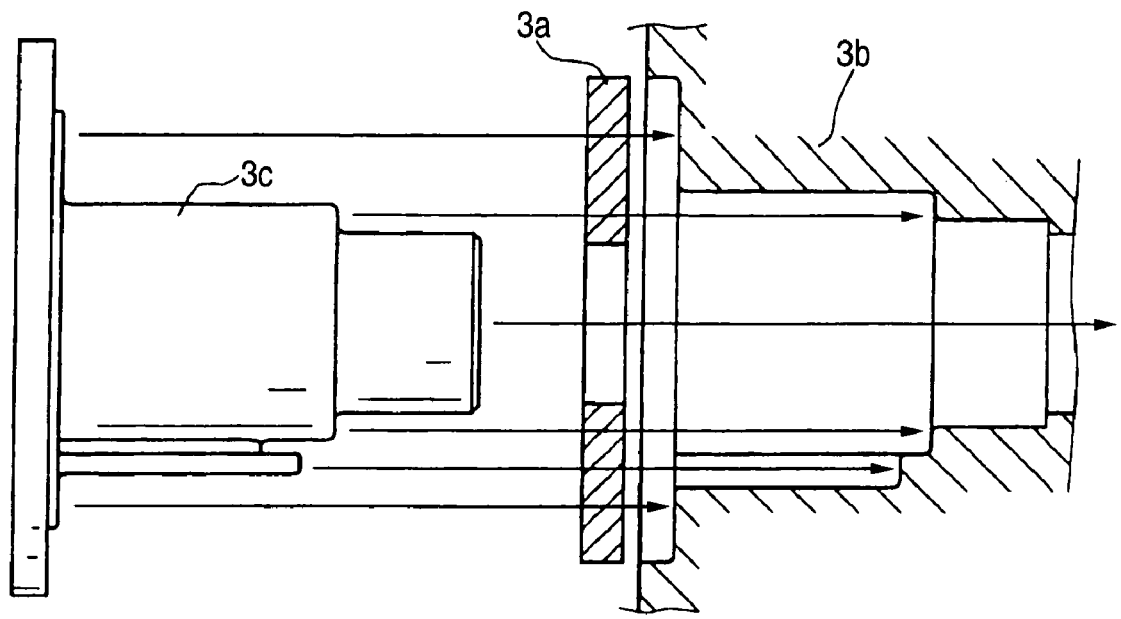
FIGS. 3A and 3B are explanatory views showing a procedure of forming the sensor housing.
Figure 3B:
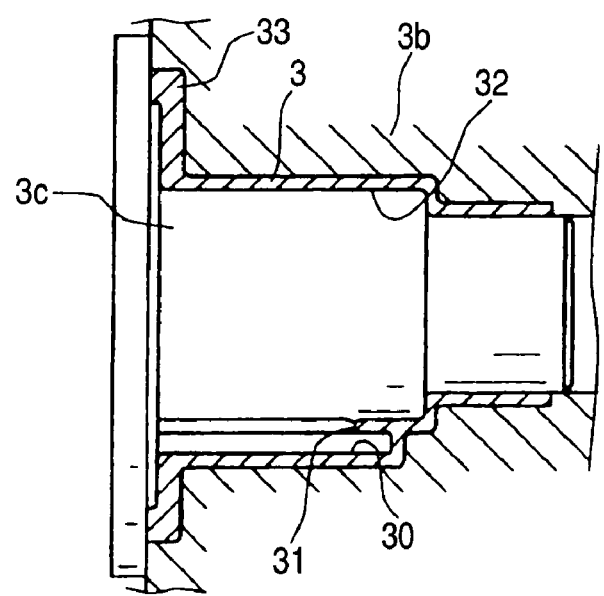

FIGS. 3A and 3B is an explanatory view for showing a procedure of forming the sensor housing 3. As shown in FIG. 3A, an annular sheet material 3a with a thickness corresponding to the maximum thickness of the connecting flange 33 is used as a material. The inner peripheral part of the sheet material 3a is opposed to one side of a female mold 3b corresponding to an outer surface shape after forming. A male mold 3c corresponding to an inner surface shape after molding is positioned in a coaxial direction in the side opposite to the opposed part. The male mold 3c is pushed into the female mold 3b as shown by arrow marks in FIG. 3A to draw and deform the inner peripheral part of the sheet material 3a between both the molds 3b and 3c by a well-known drawing (deep drawing) process. Thus, the sensor housing 3 having the cup form as described above is formed integrally with the board chamber 30 and the lead hole 31 as shown in FIG. 3B.

In the sensor housing 3 subjected to the drawing process as described above, the sensor holding hole 32 and the board chamber 30 are formed with a high form accuracy corresponding to those of the female mold 3b and the male mold 3c. Thus, an after-treatment for attaching the sensor coil 10 and the circuit board 5 to the sensor housing is not necessary Further, since the lead hole 31 through which the sensor holding hole 32 communicates with the board chamber 30 is also formed integrally therewith, the lead hole 31 does not need to be worked. Further, the outer peripheral part of the sheet material 3a used as the material can be used as the connecting flange 33 accurately perpendicular to the axis of the sensor holding hole 32. The after-treatment of the flange surface of the connecting flange 33 is not necessary. Since the sensor housing 3 formed by the drawing process is used in the torque detector 1 according to the present invention as described above, processes required before the sensor coil 10 and the circuit board 5 are attached to the sensor housing can be extremely reduced.

Figure 4:
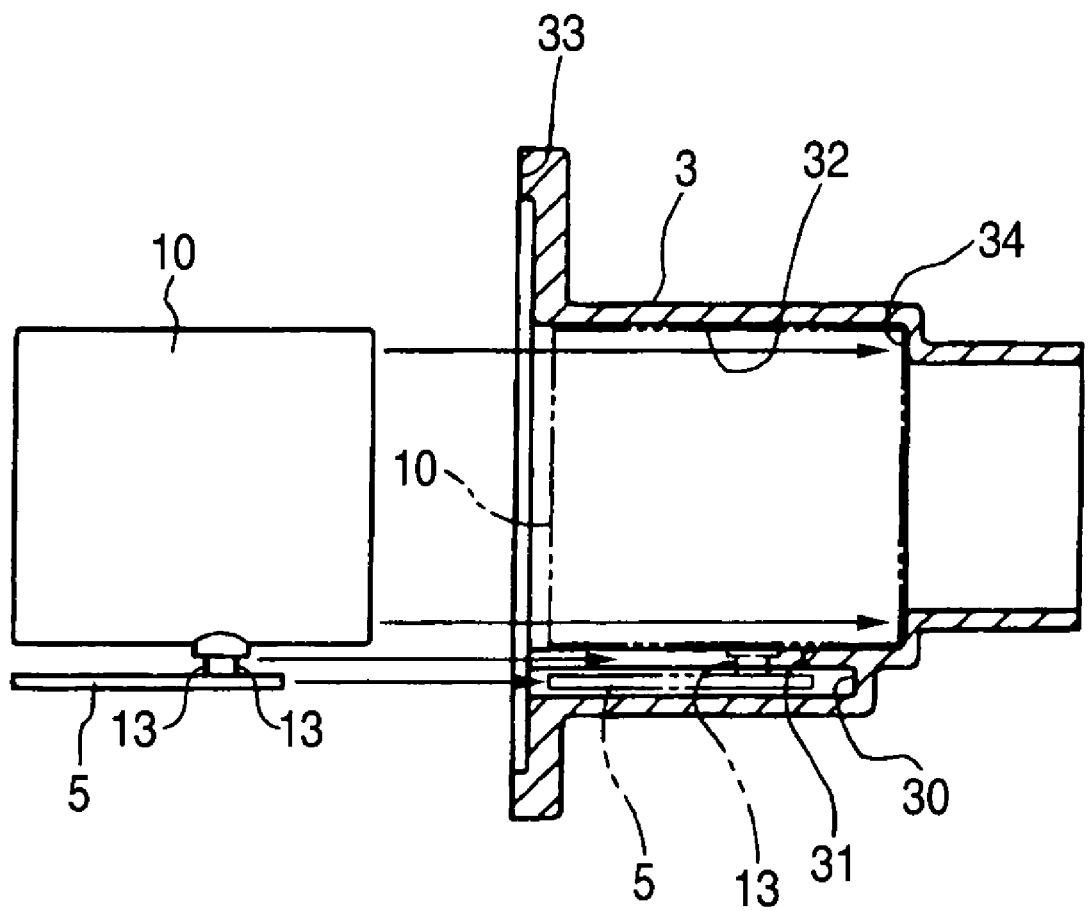
FIG. 4 is an explanatory view for explaining a procedure of attaching a sensor coil and a circuit board to the sensor housing.

FIG. 4 is an explanatory view for explaining a procedure of attaching the sensor coil 10 and the circuit board 5 to the sensor housing 3 formed as mentioned above. The sensor housing 3 includes, as shown in FIG. 2, the sensor holding hole 32 and the board chamber 30 opened to the flange surface of the connecting flange 33. The lead hole 31 through which the sensor holding hole and the board chamber communicate with each other also communicates with the flange surface. As shown by a solid line in FIG. 4, the sensor coil 10 is previously connected to the circuit board 5 through the lead 13. As shown by arrow marks in FIG. 4, the sensor coil 10 is internally fitted to the sensor holding hole 32. At the same time, while the lead 13 is inserted into the lead hole 31 through the opening 31a provided on the flange surface, the circuit board 5 is inserted into the board chamber 30 through the opening 30a provided on the flange surface. The end face of the sensor coil 10 is allowed to abut on a step part 34 provided in the interior side of the sensor holding hole 32. Thus, as shown by two-dot-chain lines in FIG. 4, an attachment is completed.

In the above-described attaching procedure, since the sensor coil 10 is previously connected to the circuit board 5 outside the sensor housing 3, a connection is made easy and can be assuredly carried out. Further, the sensor coil 10 formed integrally with the circuit board 5 in such a connection can be attached to the sensor housing by a process of pushing them into the sensor housing 3 from one side in the longitudinal direction. Therefore, the number of attaching processes can be greatly reduced.

Since the circuit board 5 inserted into the board chamber 30 is supported by the sensor coil 10 through the lead 13, the circuit board 5 does not always need to be fixed in the board chamber 30. However, when the circuit board is applied to the electric power steering apparatus, there is a fear that a connection failure may possibly occur in the connecting part to the lead 13 with the lapse of time due to an external operation such as a vibration during running. Thus, preferably, after the attachment of the sensor coil and the circuit board to the sensor housing, the circuit board 5 may be loosely fixed in the board chamber 30 by inserting a spacer into a space generated between the circuit board 5 and the inner surface of the board chamber 30, for instance.

After the above-described attachment, the openings 30a and 31a of the board chamber 30 and the lead hole 31 communicating with the flange surface of the connecting flange 33 are closed by a spacer board 8 interposed between the transmitting housing 4 connected to the sensor housing 3 through the connecting flange 33 and the sensor housing 3, as shown in FIG. 1. Thus, the torque detector 1 in the sensor housing 3 is isolated from the worm gear transmission device 6 in the transmitting housing 4. The spacer board 8 also serves as a bearing supporter for supporting the intermediate part of the second shaft 22 as shown in FIG. 1.

The sensor housing 3 formed by the deep drawing process as described above can have its thickness reduced and can be made of steel without increasing its weight. Thus, even when the sensor housing is applied to the electric power steering apparatus, the influence of external electromagnetic noise generated from an engine, devices mounted on a vehicle or the like applied to the sensor coil 10 and the circuit board 5 can be suppressed to a negligible degree. Accordingly, torque can be highly accurately detected. The sensor housing 3 made of a magnetic material can reduce the influence of the electromagnetic noise. As described above, the sensor housing is made of steel, so that additional effects that an adequate strength can be ensured and a cost can be lowered can be obtained.

In the above-described embodiment, although the board chamber 30 for accommodating the circuit board 5 is provided as a chamber whose top surface is closed, the top surface of the board chamber 30 may be opened. And the opening part may be formed closable by a suitable cover so that the maintenance and the replacement of the circuit board 5 may be performed. The board chamber 30 whose top surface is opened can be realized in such a manner that, for instance, the top plate of the board chamber 30 is formed to be thin upon forming the board chamber by a drawing process and a little work of slightly cutting the top plate after forming the board chamber is performed.

Further, the torque detector 1 is not limited to the structure shown in the drawings in which the relative angular displacement between the first and second shafts forming the column shaft 2 is taken out as the change of impedance of the sensor coil 10 as the sensor part. Further, the torque detector 1 may be realized by other structures. It is to be understood that even when these structures are employed, the same effects can be obtained by the above-described structure of the sensor housing 3 including the sensor holding hole to which the sensor part is internally fitted and held and the board chamber for accommodating the circuit board.

Further, in the above-described embodiment, although the torque detector used in the electric power steering apparatus is explained, the present invention may be applied to all torque detectors used for detecting the rotating torque exerted on rotating shafts in various industrial fields.

As specifically described above, in the torque detector according to the present invention, since the sensor holding hole for internally fitting and holding the sensor part, the board chamber and the lead hole are formed integrally by a drawing work, the present invention achieves excellent effects as described below. That is, a work necessary for attaching the sensor part and the circuit board to the sensor housing is reduced. Further, the sensor part and the circuit board can be attached while they are previously connected together, so that the number of works and assembling works can be reduced. Further, the sensor housing can be made of steel without greatly increasing its weight. The influence of electromagnetic noise under a using state can be reduced and torque can be highly accurately detected.

What is claimed is:

1. A torque detector comprising:
   a monolithic tubular housing for supporting a rotating shaft, including an opening at one end in a longitudinal direction;
   a sensor holding hole for holding a sensor part detecting a rotating torque exerted on the rotating shaft, which is provided inside the housing and communicates with the opening;
   a board chamber for accommodating a circuit board outputting a signal corresponding to the detected rotating torque, which is provided inside the housing and communicates with the opening;
   a partition wall between the sensor holding hole and the board chamber; and
   a lead hole passing through the partition wall, into which a lead connecting the sensor part to the circuit board is inserted and which communicates with the opening,
   wherein the housing is formed by drawing a sheet material in the longitudinal direction.

2. A torque detector according to claim 1, wherein the housing is made of steel.

3. A torque detector according to claim 1, wherein the housing includes a flange formed around the opening.

* * * * *